(12) United States Patent
Kyung et al.

(10) Patent No.: US 10,623,719 B2
(45) Date of Patent: Apr. 14, 2020

(54) MULTI-APERTURE CAMERA SYSTEM FOR IMPROVING DEPTH ACCURACY THROUGH FOCUSING DISTANCE SCAN

(71) Applicant: CENTER FOR INTEGRATED SMART SENSORS FOUNDATION, Daejeon (KR)

(72) Inventors: Chong Min Kyung, Daejeon (KR); Jun Ho Mun, Gyeonggi-do (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 85 days.

(21) Appl. No.: 15/530,246

(22) Filed: Dec. 16, 2016

(65) Prior Publication Data

US 2017/0180710 A1    Jun. 22, 2017

(30) Foreign Application Priority Data

Dec. 17, 2015    (KR) .................. 10-2015-0181137

(51) Int. Cl.
*H04N 13/271* (2018.01)
*H04N 13/236* (2018.01)
(Continued)

(52) U.S. Cl.
CPC ......... *H04N 13/271* (2018.05); *H04N 5/2259* (2013.01); *H04N 5/2356* (2013.01);
(Continued)

(58) Field of Classification Search
CPC ............... H04N 13/0271; H04N 5/332; H04N 13/0257; H04N 13/0217; H04N 13/0203;
(Continued)

(56) References Cited

U.S. PATENT DOCUMENTS

2013/0033578 A1    2/2013  Wajs
2014/0055560 A1*   2/2014  Fu .................. H04N 13/0022
                                              348/42
(Continued)

FOREIGN PATENT DOCUMENTS

CN          106982312       7/2017

OTHER PUBLICATIONS

Lee et al., Distance estimation using a single computational camera with dual off-axis color filtered apertures.

*Primary Examiner* — Dave Czekaj
*Assistant Examiner* — Samuel D Fereja
(74) *Attorney, Agent, or Firm* — Blank Rome LLP

(57) ABSTRACT

Disclosed is a multi-aperture camera system for improving depth accuracy through a focusing distance scan. The system includes a single optical system including a first aperture through which an RGB optical signal is input and a second aperture through which a non-RGB optical signal is input, the single optical system moving relative to an image sensor to be arranged at positions; an image sensor configured to obtain image sets corresponding to the positions as the single optical system moves to be arranged at the positions, wherein each image set includes an RGB image based on the RGB optical signal and a non-RGB image based on the non-RGB optical signal; and a depth determination unit configured to calculate a disparity in each image set to determine a depth of an object by using the disparity, wherein the first and second apertures have mutually intersecting central positions.

6 Claims, 9 Drawing Sheets

(51) Int. Cl.
*H04N 13/214* (2018.01)
*H04N 5/235* (2006.01)
*H04N 13/207* (2018.01)
*H04N 5/225* (2006.01)
*H04N 5/33* (2006.01)
*H04N 13/00* (2018.01)

(52) U.S. Cl.
CPC ........... *H04N 5/332* (2013.01); *H04N 13/207* (2018.05); *H04N 13/214* (2018.05); *H04N 13/236* (2018.05); *H04N 2013/0081* (2013.01)

(58) Field of Classification Search
CPC ........... H04N 5/23212; H04N 13/0214; H04N 13/0253; H04N 2013/0081; H04N 13/0022; H04N 13/025; H04N 13/0235; H04N 5/2254; H04N 5/2353; H04N 5/33; H04N 13/0225; H04N 13/0242; H04N 5/225; H04N 5/23238; H04N 5/2354; H04N 5/2355; H04N 5/357; H04N 5/3696; H04N 9/045; H04N 13/0296; H04N 2013/0077; H04N 5/2226; H04N 5/2253; H04N 5/2259; H04N 5/335; H04N 9/04; H04N 13/0003; H04N 13/0048

See application file for complete search history.

(56) References Cited

U.S. PATENT DOCUMENTS

| | | | |
|---|---|---|---|
| 2016/0004925 A1* | 1/2016 | Paramonov | H04N 13/0253 382/190 |
| 2016/0018574 A1 | 1/2016 | Choi et al. | |
| 2016/0042522 A1* | 2/2016 | Wajs | H04N 5/2254 348/335 |
| 2016/0063714 A1* | 3/2016 | Middleton | G06T 7/11 382/195 |
| 2017/0026632 A1* | 1/2017 | Ishiga | G02B 7/34 |

* cited by examiner

FIG. 1
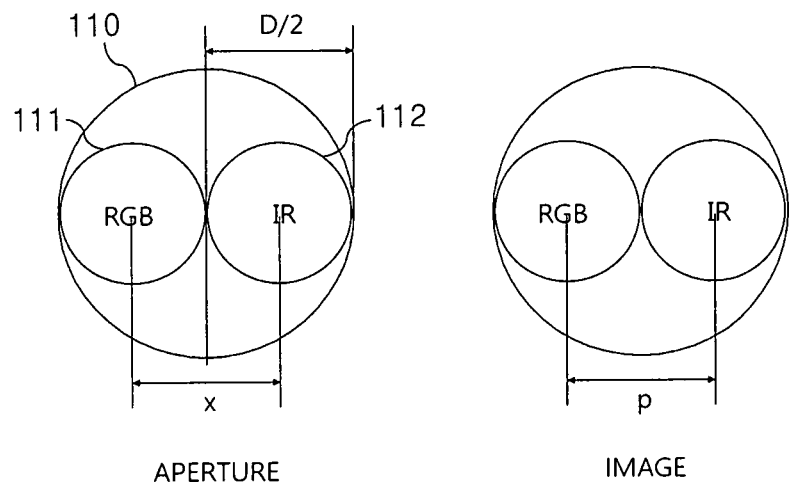
APERTURE     IMAGE
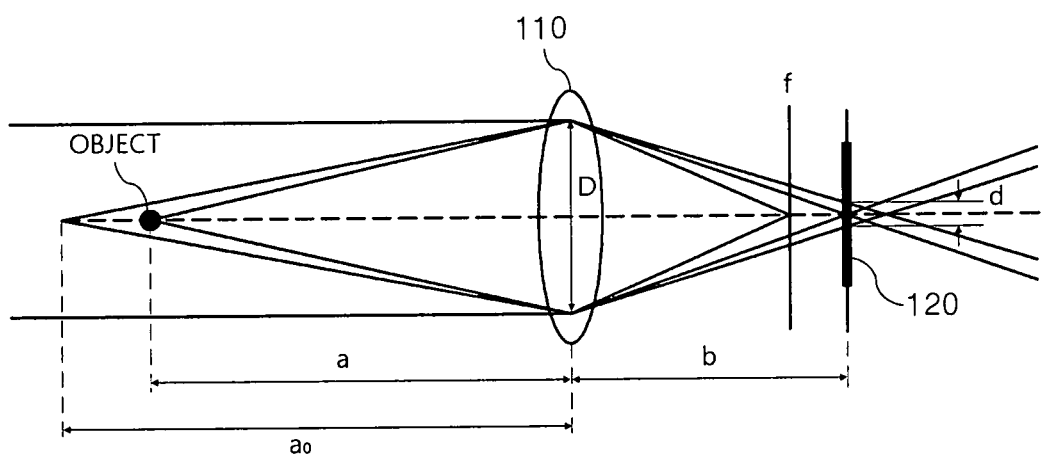

MULTI-APERTURE CAMERA SYSTEM FOR IMPROVING DEPTH ACCURACY THROUGH FOCUSING DISTANCE SCAN

BACKGROUND

Embodiments of the inventive concept described herein relate to a multi-aperture camera system which determines a depth of an object based on a disparity, and more particularly, relate to a technique of improving accuracy of the depth of an object using focusing distance scan.

A technique of determining a depth of an object according to the related art arbitrarily sets the positions of an optical system and an image sensor instead of setting the positions of the optical system and the image sensor to allow the image sensor to approach to the optical system to a focusing distance, such that the depth of the object is estimated by using a plurality of images obtained by the image sensor through the optical system.

For example, a depth-from-defocus (DFD) technique according to the related art arbitrarily sets the positions of an optical system and an image sensor such that the depth of an object is estimated by using a blur size of each of a plurality of images obtained through a plurality of apertures formed in the optical system in a state that the image sensor and the optical system are not arranged to approach to each other to a focusing distance.

As another example, a disparity using technique according to the related art includes two camera modules each having an optical system and an image sensor and arbitrarily sets the positions of the optical systems and the image sensors of the camera modules, such that the depth of an object is estimated by using a disparity between images obtained through the two camera modules in a state that the image sensor and the optical system of each camera module are not arranged to approach to each other to a focusing distance.

According to the techniques of determining a depth of an object described above, since the positions of the optical system and the image sensor are arbitrarily set to use the blur size or the disparity, so that the image sensor and the optical system are not arranged to approach to the focusing distance, it is difficult to accurately calculate the depth of an object.

Thus, to solve the problems of a technique of determining a depth of an object according to the related art, the following embodiments disclose a technique of determining a depth of an object by moving an optical system relative to an image sensor to be arranged at a plurality of positions and by scanning a plurality of focusing distances.

SUMMARY

Embodiments of the inventive concept provide a multi-aperture system which is capable of determining a depth of an object by using a plurality of image sets obtained by moving an optical system relative to an image sensor to be arranged at a plurality of positions, and a method of operating the same, wherein each of the image sets includes an RGB image and a non-RGB image.

In detail, embodiments of the inventive concept provide a multi-aperture system which is capable of determining a depth of an object by using a disparity in each of a plurality of image sets obtained by moving a single optical system relative to an image sensor, and a method of operating the same, wherein the optical system is formed with apertures having mutually intersecting central positions.

In addition, embodiments of the inventive concept provide a multi-aperture system which is capable of determining a depth of an object by using a variation of a blur size in each of a plurality of image sets obtained by moving an optical system relative to an image sensor, and a method of operating the same, wherein the optical system is formed with apertures through which optical signals in mutually different wavelength bands are input.

Therefore, embodiments of the inventive concept provide a multi-aperture system which is capable of more accurately determining a depth of an object by moving an optical system relative to an image sensor to scan a plurality of focusing distances, and a method of operating the same, as compared with the techniques of determining a depth of an object according to the related art.

According to an aspect of an embodiment, there is provided a multi-aperture camera system for improving depth accuracy through a focusing distance scan, which includes: a single optical system including a first aperture through which an RGB optical signal is input and a second aperture through which a non-RGB optical signal in a wavelength band different from a wavelength band of the RGB optical signal is input, the single optical system moving relative to an image sensor to be arranged at a plurality of positions; an image sensor configured to obtain a plurality of image sets corresponding to the positions as the single optical system moves relative to the image sensor to be arranged at the positions, wherein each of the image sets includes an RGB image obtained by processing the RGB optical signal and a non-RGB image obtained by processing the non-RGB optical signal; and a depth determination unit configured to calculate a disparity in each of the image sets and to determine a depth of an object by using the disparity in each of the image sets, wherein the first aperture and the second aperture are formed on the single optical system such that the first aperture and the second aperture have mutually intersecting central positions.

The depth determination unit may calculate correlation of each of the image sets and determine the depth of the object by using the disparity in at least one of the image sets based on the correlation of each of the image sets.

The depth determination unit may select one image set having a highest correlation from the image sets based on the correlations of the image sets, and determine the depth of the object by using the disparity in the selected image set.

The depth determination unit may set weights to the image sets based on the correlations of the image sets, respectively, extract a plurality of depths of the object by using the disparities in the image sets, and determine the depth of the object based on an average value of the depths to which the weights are applied.

The depth determination unit may select some of the image sets based on the weights of the image sets, extract a plurality of depths of the object by using disparities in the selected image sets, and determine the depth of the object based on an average value of the depths to which the weights are applied.

The depth determination unit 530 may calculate the depth from the object to the single optical system, based on the disparity in each of the image sets, a distance between the central positions of the first and second apertures, the depth of the object focused on the image sensor at each of the positions, and a focal length at each of the positions at which the signal optical system is arranged.

The disparity in each of the image sets may include a disparity between the RGB image and the non-RGB image included in each of the image sets.

The first and second apertures may be formed to have central positions such that the first and second apertures are offset in at least one of vertical, horizontal and oblique directions of the image sensor.

According to another aspect of an embodiment, there is provided a multi-aperture camera system for improving depth accuracy through a focusing distance scan, which includes: an optical system including a first aperture through which an RGB optical signal is input and a second aperture through which a non-RGB optical signal in a wavelength band different from a wavelength band of the RGB optical signal is input, the optical system moving relative to an image sensor to be arranged at a plurality of positions; an image sensor configured to obtain a plurality of image sets corresponding to the positions as the optical system moves relative to the image sensor to be arranged at the positions, wherein each of the image sets includes an RGB image obtained by processing the RGB optical signal and a non-RGB image obtained by processing the non-RGB optical signal; and a depth determination unit configured to determine depth of an object by using a variation of a blur size in each of the image sets.

The depth determination unit may calculate correlation of each of the image sets and determine the depth of the object by using the variation of the blur size in at least one of the image sets based on the correlation of each of the image sets.

According to still another aspect of an embodiment, there is provided a method of operating a multi-aperture camera system for improving depth accuracy through a focusing distance scan, which includes: moving a single optical system relative to an image sensor such that the single optical system is arranged at a plurality of positions, wherein the single optical system includes a first aperture through which an RGB optical signal is input and a second aperture through which a non-RGB optical signal in a wavelength band different from a wavelength band of the RGB optical signal is input; allowing the RGB and non-RGB optical signals to be input through the first and second apertures, wherein the first and second apertures are formed in the single optical system which is arranged relative to the image sensor at each of the positions; and obtaining a plurality of image sets corresponding to the positions as the single optical system is arranged at each of the positions, wherein each of the image sets includes an RGB image obtained by processing the RGB optical signal and a non-RGB image obtained by processing the non-RGB optical signal; and determining a depth of an object by using a disparity in each of the image sets, wherein the first and second apertures are formed on the single optical system such that the first and second apertures have mutually intersecting central positions.

The determining of the depth of the object may include: calculating correlation of each of the image sets; and determining the depth of the object by using the disparity in at least one of the image sets based on the correlation of each of the image sets.

According to still another aspect of an embodiment, there is provided a method of operating a multi-aperture camera system for improving depth accuracy through a focusing distance scan, which includes: moving an optical system such that the optical system is arranged at a plurality of positions, wherein the optical system includes a first aperture through which an RGB optical signal is input and a second aperture through which a non-RGB optical signal in a wavelength band different from a wavelength band of the RGB optical signal is input; allowing the RGB and non-RGB optical signals to be input through the first and second apertures, wherein the first and second apertures are formed in the optical system which is arranged at each of the positions; obtaining a plurality of image sets corresponding to the positions as the optical system are arranged at each of the positions, wherein each of the image sets includes an RGB image obtained by processing the RGB optical signal and a non-RGB image obtained by processing the non-RGB optical signal; and determining a depth of an object by using a variation of a blur size in each of the image sets.

The embodiments of the inventive concept may provide a multi-aperture system which is capable of determining a depth of an object by using a plurality of image sets obtained by moving an optical system relative to an image sensor to be arranged at a plurality of positions, and a method of operating the same, wherein each of the image sets includes an RGB image and a non-RGB image.

In detail, the embodiments of the inventive concept may provide a multi-aperture system which is capable of determining a depth of an object by using a disparity in each of a plurality of image sets obtained by moving a single optical system relative to an image sensor, and a method of operating the same, wherein the optical system is formed with apertures having mutually intersecting central positions.

In addition, the embodiments of the inventive concept may provide a multi-aperture system which is capable of determining a depth of an object by using a variation of a blur size in each of a plurality of image sets obtained by moving an optical system relative to an image sensor, and a method of operating the same, wherein the optical system is formed with apertures through which optical signals in mutually different wavelength bands are input.

Therefore, embodiments of the inventive concept may provide a multi-aperture system which is capable of more accurately determining a depth of an object by moving an optical system relative to an image sensor to scan a plurality of focusing distances, and a method of operating the same, as compared with the techniques of determining a depth of an object according to the related art.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 is a view illustrating a principle of determining a depth between an image sensor and an object using disparity in a multi-aperture camera according to an embodiment of the inventive concept;

DETAILED DESCRIPTION

Figure 2:
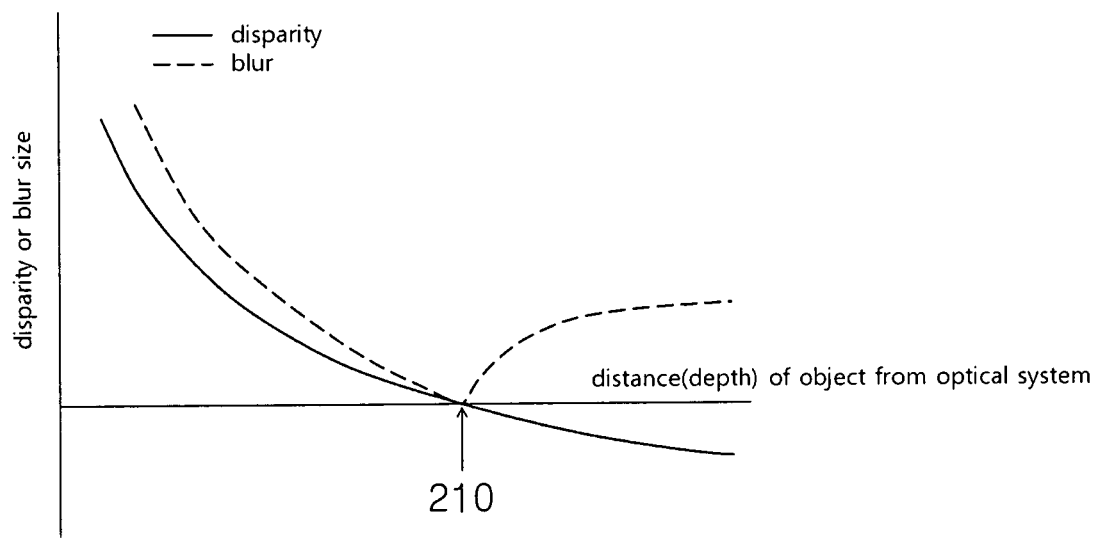
FIG. 2 is a graphical view illustrating accuracy of the depth of an object according to a focusing distance in a multi-aperture camera system according to an embodiment of the inventive concept.

Hereinafter embodiments of the inventive concept will be described in detail with reference to the accompanying drawings. However, it should be understood that the inventive concept is not limited to the following embodiments. In addition, the same reference numerals used in each drawing represent the same elements.

In addition, terminologies used herein are defined to appropriately describe the exemplary embodiments of the inventive concept and thus may be changed depending on a viewer, the intent of an operator, or a custom. Accordingly, the terminologies must be defined based on the following overall description of this disclosure.

FIG. 1 is a view illustrating a principle of determining a depth between an image sensor and an object using disparity in a multi-aperture camera according to an embodiment of the inventive concept.

Referring to FIG. 1, a multi-aperture camera system determines a depth of an object by using first and second apertures 111 and 112 formed on a single optical system 110, where the first and second apertures 111 and 112 are offset in at least one of vertical, horizontal and oblique directions to an image sensor 120 such that the first and second apertures 111 and 112 have mutually intersecting central positions. The single optical system 110 may be an optical device including a filter and a lens in which the first and second apertures 111 and 112 are formed.

Hereinafter, the depth of an object may be defined as a distance between the image sensor and the object, that is, a distance between a first principal plane of the single optical system 110 and the object. As will be described below, in this case, the distance between the image sensor (120) and the object may be calculated by adding the distance between the first principal plane of the single optical system 110 and the object to the distance between the first principal plane of the single optical system 110 and the image sensor 120 (where the distance between the first principal plane of the single optical system 110 and the image sensor 120 is preset in the multi-aperture camera system). Thus, the distance between the image sensor 120 and the object is determined by the distance between the first principal plane of the single optical system 110 and the object.

In this case, the first aperture is formed to allow an RGB optical signal (for example, an optical signal in the wavelength band of 400 nm to 650 nm) to pass therethrough. The second aperture 112 is formed to allow a non-RGB optical signal in a wavelength band different from that of the RGB optical signal to pass therethrough. Although an IR optical signal (for example, an optical signal in the wavelength band of 650 nm to 810 nm) passing through the second aperture 112 is illustrated in the following description, the embodiment is not limited thereto, and non-RGB optical signals in various wavelength bands different from that of the RGB optical signal may pass through the second aperture 112.

In this case, since the first and second apertures 111 and 112 are formed to have mutually intersecting central positions, the central position of an RGB image of the object, which is obtained by processing the RGB optical signal introduced through the first aperture 111 by the image sensor 120 is not generally identical to that of a non-RGB image of the object obtained by processing the IR optical signal introduced through the second aperture 112 by the image sensor 120. For example, when the image sensor 120 is arranged at a position to be closer to the single optical system 110 than at the position depicted in FIG. 1, the central position of the non-RGB image is shifted right with respect to the central position of the RGB image. When the image sensor 120 is arranged at a position to be more away from the single optical system 110 than at the position depicted in FIG. 1, the central position of the non-RGB image is shifted left with respect to the central position of the RGB image.

The multi-aperture camera system may calculate a disparity p between the RGB image and the non-RGB image expressed as following Equation 1 by using the principle described above. Hereinafter, the disparity between the RGB image and the non-RGB image implies the disparity between the central position of the RGB image and the central position of the non-RGB image (specifically, the disparity between the central position of the object in the RGB image and the central position of the object in the non-RGB image).

$$p = \frac{xf}{a_0 - f}\left(\frac{a_0}{a} - 1\right) \quad \text{[Equation 1]}$$

In Equation 1, 'x' represents a distance between the central positions of the first and second apertures 111 and 112, 'f' represents a focal length (which is a distance between the single optical system 110 and the focal plane in which an image is in focus), 'a' represents an object depth (which is a distance between the object and the first principal plane of the single optical system 110), and '$a_0$' represents the depth of an object which is focused on the image sensor 120.

In this case, when the value of the disparity p between the central positions of the RGB image and the non-RGB image is changed from a positive number to a negative number or from a negative number to a positive number, the disparity directions of both images are changed. Thus, based on the sign of a 'p' value, it may be determined whether the object is located in the foreground or background based on a focused position.

In addition, to calculate the object depth 'a', Equation 1 may be rewritten as following Equation 2.

$$a = \frac{a_0}{1 + \frac{(a_0 - f)}{f} \cdot \frac{p}{x}} \quad \text{[Equation 2]}$$

In Equation 2, '$a_0$' represents the depth of an object which is focused on the image sensor 120, 'f' represents a focal length, 'p' represents a disparity between the RGB image and the non-RGB image, and 'x' represents a distance between the central positions of the first and second apertures 111 and 112.

Thus, a depth c between the image sensor 120 and the object may be determined as following Equation 3.

$$c = a + b \quad \text{[Equation 3]}$$

In Equation 3, 'a' represents an object depth (which is a distance between the object and the first principal plane of the single optical system 110), and 'b' represents a distance between the first principle plane of the single optical system 110 and the image sensor 120.

In this case, the first and second apertures 111 and 112 are formed to be offset in at least one of the vertical, horizontal and oblique directions to an image sensor 120 such that the first and second apertures 111 and 112 have mutually intersecting central positions, so a scan line processing scheme may be applied to determine the depth (where the scan line processing scheme may be performed in at least one of the vertical, horizontal and oblique directions to an image sensor 120). For example, the first and second apertures 111 and 112 may be aligned such that at least one of the horizontal direction (X-axis direction), vertical direction (Y-axis direction), and oblique direction (direction oblique to X-axis and Y-axis) to an image sensor 120 is aligned with that of a line segment connecting the centers of the first and second apertures 111 and 112. Thus, since the angle between the offset direction of the first and second apertures 111 and 112 and at least one of the horizontal, vertical and oblique directions of the image sensor 120 is set to ideally approximate to '0 (zero)', the scan line processing scheme may be easily applied to the multi-aperture camera system. That is, the first and second apertures 111 and 112 may be formed to have central positions such that the first and second apertures 111 and 112 are offset in a proceeding direction of the scan line processing scheme applied to the image sensor 120.

In this case, when the angle between the offset direction of the first and second apertures 111 and 112 and the horizontal direction of the image sensor 120 is not set to approximate to '0', the multi-aperture camera system expands a disparity search region such that the scan line processing scheme may be applied.

The multi-aperture camera system according to an embodiment of the inventive concept, as described above, may determine the depth of an object based on the principle of using the disparity between the RGB image and the non-RGB image. The details will be described below.

In addition, instead of the principle of using the disparity between the RGB image and the non-RGB image described above, a multi-aperture camera system according to another embodiment of the inventive concept may determine the depth of an object based on the principle of using the variation in the size of blur between the RGB and non-RGB images obtained from input optical signals having mutually different wavelength bands. As a scheme of determining the depth by using variation in the size of blur, a conventional DFD technique of determining the depth by using the variation of the blur size between two images may be used.

FIG. 2 is a graphical view illustrating accuracy of the depth of an object according to a focusing distance in a multi-aperture camera system according to an embodiment of the inventive concept.

Referring to the graph of FIG. 2 concerned with the disparity (or variation of the blur size) between the depth from the object to the signal optical system and the images obtained through the apertures formed in the signal optical system, when the disparity or the variation of the blur size between the RGB and non-RGB images obtained through the apertures approximates to '0 (zero)' 210, the depth from the object to the single optical system may be ideally and most accurately obtained.

That is, since the case that the disparity or the variation of the blur size between the RGB and non-RGB images obtained through the apertures approximates to '0' implies that the image sensor is located at the focusing distance in the optical system (the image sensor is located on the focal plate on which the object is focused), when the image sensor is located at the focusing distance in the optical system, the most accurate depth may be determined by using the disparity or the variation of the blur size between the RGB and non-RGB images obtained by the image sensor through the optical system.

Therefore, according to the multi-aperture camera system of an embodiment, the optical system may be arranged at plural positions relative to the image sensor in order to determine the accurate depth of the object, such that the image sensor is located relative to the optical system to approach to the focusing distance or located at each focusing distance. The details will be described with reference to FIG. 3.

Figure 3:
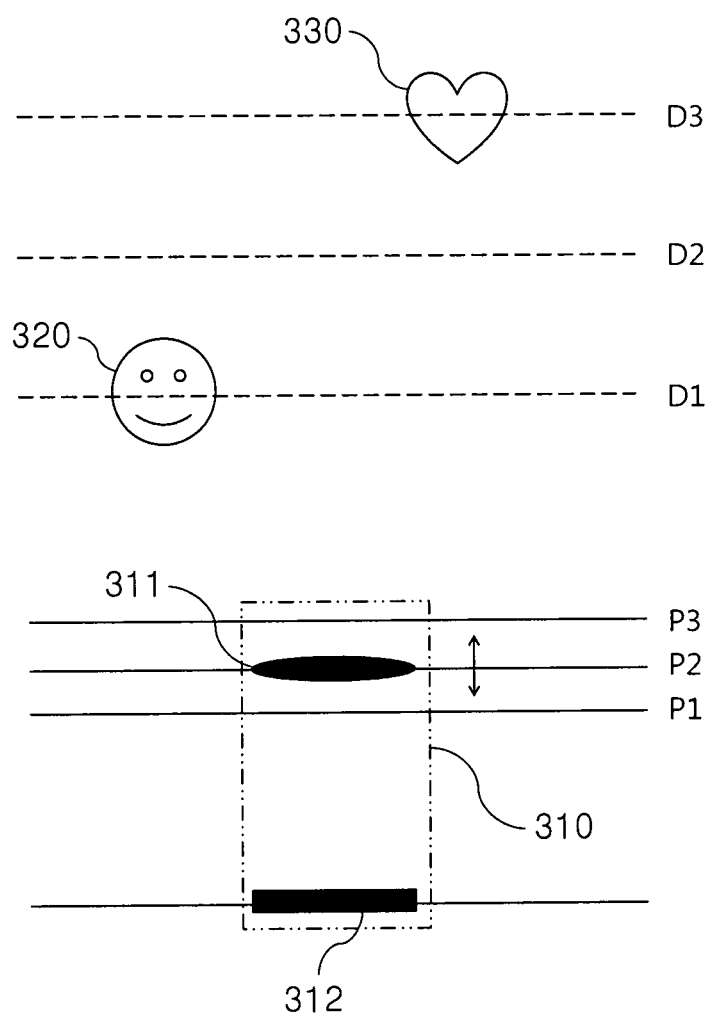
FIG. 3 is a view illustrating a process of determining a depth by a multi-aperture camera system according to an embodiment of the inventive concept.

FIG. 3 is a view illustrating a process of determining a depth by a multi-aperture camera system according to an embodiment of the inventive concept.

Referring to FIG. 3, a multi-aperture camera system 310 may obtain a plurality of image sets corresponding to a plurality of positions P1, P2 and P3 relative to the image sensor 312 through the first aperture (through which the RGB optical signal is input) and the second aperture (through which the non-RGB optical signal in the wavelength band different from the wavelength band of the RGB optical signal is input), which are formed in the optical system 311, by moving the optical system 311 to be arranged at the position P1, P2 or P3 relative to the image sensor 312. Hereinafter, the fact that the optical system 311 moves to be arranged at the position P1, P2 or P3 implies that the optical system 311 moves relative to the image sensor 312 such that the optical system is arranged at the position P1, P2 or P3 relative to the image sensor 312.

For example, as the multi-aperture camera system 310 moves the optical system 311 relative to a first object 320 such that the optical system 311 is arranged at position P1, position P2 and position P3, image set P1 (P1-RGB image and P1-non-RGB image) may be obtained when the optical system 311 is placed at position P1, image set P2 (P2-RGB image and P2-non-RGB image) may be obtained when the optical system 311 is placed at position P2, and image set P3 (P3-RGB image and P3-non-RGB image) may be obtained when the optical system 311 is placed at position P3.

Likewise, as the multi-aperture camera system 310 moves the optical system 311 relative to a second object 330 such that the optical system 311 is arranged at positions P1, P2 and P3, image set P1 (P1-ROB image and P1-non-RGB image) may be obtained when the optical system 311 is placed at position P1, image set P2 (P2-RGB image and P2-non-RGB image) may be obtained when the optical system 311 is placed at position P2, and image set P3 (P3-RGB image and P3-non-RGB image) may be obtained when the optical system 311 is placed at position P3.

In this case, as described with reference to FIG. 1, the first and second apertures may be formed on the optical system 311 such that the first and second apertures have mutually intersecting central positions, and the optical system 311 may imply a single optical system in which both the first and second apertures are formed.

Thus, the multi-aperture camera system 310 may calculate the disparity in each image set to determine the depth by using the disparity in each image set. In this case, the disparity in each image set implies the disparity between the RGB and non-RGB images included in each image set.

In detail, the multi-aperture camera system 310 may calculate correlation of each image set such that the depth of the object is determined by using the disparity in at least one of the image sets based on the correlation of each image set.

For example, when a position (a position of the optical system 311 having the focusing distance), at which the optical system 311 is arranged to focus the first object 320 located at distance D1 from the optical system 311, is position P1, after calculating the correlation (the correlation between the P1-RGB image and P1-non-RGB image) of the image set P1 of the first object 320, the correlation (the correlation between the P2-RGB image and P2-non-RGB image) of the image set P2, and the correlation (the correlation between the P3-RGB image and P3-non-RGB image) of the image set P3, the multi-aperture camera system 310 may extract the image set P1 having the highest correlation based on the correlations of the image sets P1, P2 and P3, such that the depth of the first object 320 is determined to have a value approximate to the actual distance D1 of the first object 320 by using the disparity in the extracted image set P1. The detailed process of determining the depth of an object by using a disparity may be performed based on the principle described with reference to FIG. 1. The details will be further described with reference to FIG. 8.

As another example, when a position, at which the optical system 311 is arranged to focus the first object 320 located at the distance D1 from the optical system 311 on the image sensor 312, is position P1, after calculating the correlations of the image set P1, the image set P2 and image set P3 of the first object 320, the multi-aperture camera system 310 may set weights of the image set P1, the image set P2 and image set P3 based on the correlations of the image set P1, the image set P2 and the image set P3. In this case, since the correlation of the image set P1 is greatest, the first highest weight may be set to the image set P1. Since the correlation of the image set P2 is the second highest correlation, the second highest weight may be set to the image set P2. In addition, since the correlation of the image set P3 is lowest, the lowest weight may be set to the image set P3. Thus, the multi-aperture camera system 310 may determine the depth of the first object 320 based on the average value of the depths calculated based on the disparities in the image sets P1, P2 and P3 and weighted with the weights set to the depths (for example, the average of the value obtained by applying a weight to the depth calculated based on the disparity in the image set P1, the value obtained by applying a weight to the depth calculated based on the disparity in the image set P2, and the value obtained by applying a weight to the depth calculated based on the disparity in the image set P3). In this case, the depth determined for the first object 320 may have a value between actual distances D1 and D3 of the first object 320 and specifically, may have a value approximate to the actual distance D1 of the first object 320.

In this case, instead of applying a weight to the depth of the first object calculated by using the disparity in each image set, the multi-aperture camera system 310 may apply a weight to the disparity itself in each image set such that the multi-aperture camera system 310 determines the depth of the first object 320 by using the disparity in each image set to which a weight is applied.

In addition, instead of applying the weights set to the depths calculated based on the disparities in the image sets P1, P2 and P3, the multi-aperture camera system 310 may extract the image sets P1 and P2 to which high weights are set among the image sets, such that the multi-aperture camera system 310 determines the depth of the first object 320 based on the average value of the depths calculated based on the disparities in the image sets P1 and P2 and weighted with the weights set to the depths (for example, the average calculated based on the value obtained by applying a weight to the depth calculated based on the disparity in the image set P1, and the value obtained by applying a weight to the depth calculated based on the disparity in the image set P2). In this case, the depth determined for the first object 320 may have a value between the actual distances D1 and D2 of the first object 320 and specifically, may have a value approximate to the actual distance D1 of the first object 320.

As another example, when a position (a position of the optical system 311 having the focusing distance), at which the optical system 311 is arranged to focus the first object 320 located at distance D3 from the optical system 311, is position P3, after calculating the correlations of the image sets P1, P2 and P3, the multi-aperture camera system 310 may extract the image set P3 having the highest correlation based on the correlations of the image sets P1, P2 and P3, such that the depth of the second object 330 is determined to have a value approximate to the actual distance D3 of the second object 330 by using the disparity in the extracted image set P3.

Likewise, when a position, at which the optical system 311 is arranged to focus the second object 330 located at the distance D3 from the optical system 311 on the image sensor 312, is the position P3, after calculating the correlations of the image sets P1, P2 and P3 of the second object 330, the multi-aperture camera system 310 may set weights of the image sets P1, P2 and P3 based on the correlations of the image sets P1, P2 and P3. In this case, since the correlation of the image set P1 is lowest, the first lowest weight may be set to the image set P1. Since the correlation of the image set P2 is the second lowest correlation, the second lowest weight may be set to the image set P2. In addition, since the correlation of the image set P3 is highest, the highest weight may be set to the image set P3. Thus, the multi-aperture camera system 310 may determine the depth of the second object 330 based on the average value of the depths calculated based on the disparities in the image sets P1, P2 and P3 and weighted with the weights set to the depths (for example, the average of the value obtained by applying a weight to the depth calculated based on the disparity in the image set P1, the value obtained by applying a weight to the depth calculated based on the disparity in the image set P2, and the value obtained by applying a weight to the depth calculated based on the disparity in the image set P3). In this case, the depth determined for the second object 330 may have a value between actual distances D3 and D1 of the second object 330 and specifically, may have a value approximate to the actual distance D3 of the second object 330.

In addition, the multi-aperture camera system 310 may extract the image sets P3 and P2 to which the high weights are set among the image sets, such that the multi-aperture camera system 310 determines the depth of the second object 330 based on the average value of the depths calculated based on the disparities in the extracted image set P3 and P2 and weighted with the weights set to the depths (for example, the average calculated based on the value obtained by applying a weight to the depth calculated based on the disparity in the image set P3, and the value obtained by applying a weight to the depth calculated based on the disparity in the image set P2). In this case, the depth determined for the second object 330 may have a value between the actual distances D3 and D2 of the second object 330 and specifically, may have a value approximate to the actual distance D3 of the second object 320.

As described above, the multi-aperture camera system 310 according to an embodiment of the inventive concept may determine the depths of the object 320 and 330 by moving the optical system 311 to be arranged at the position P1, P2 or P3, so that a more accurate depth may be obtained than that by the related art.

In addition, a multi-aperture camera system according to another embodiment of the inventive concept may determine the depth by using the variation of a blur size of each image set after obtaining the image sets corresponding to a plurality of positions P1, P2 and P3 through the first aperture (through which the RGB optical signal is input) and the second aperture (through which the non-RGB optical signal in the wavelength band different from the wavelength band of the RGB optical signal is input), which are formed in the optical system, by moving the optical system to be arranged at the position P1, P2 or P3.

In detail, the multi-aperture camera system may calculate correlation of each image set such that the depth of the object is determined by using the variation of the blur size in at least one of the image sets based on the correlation of each image set.

As described above, the multi-aperture camera system according to another embodiment is different from that 310 of the previously described embodiment only in terms of which of the variation of the blur size and the disparity is used when the depth is calculated in at least one of the image sets, but the other processes are the same. The details will be described with reference to FIG. 9.

Figure 4:
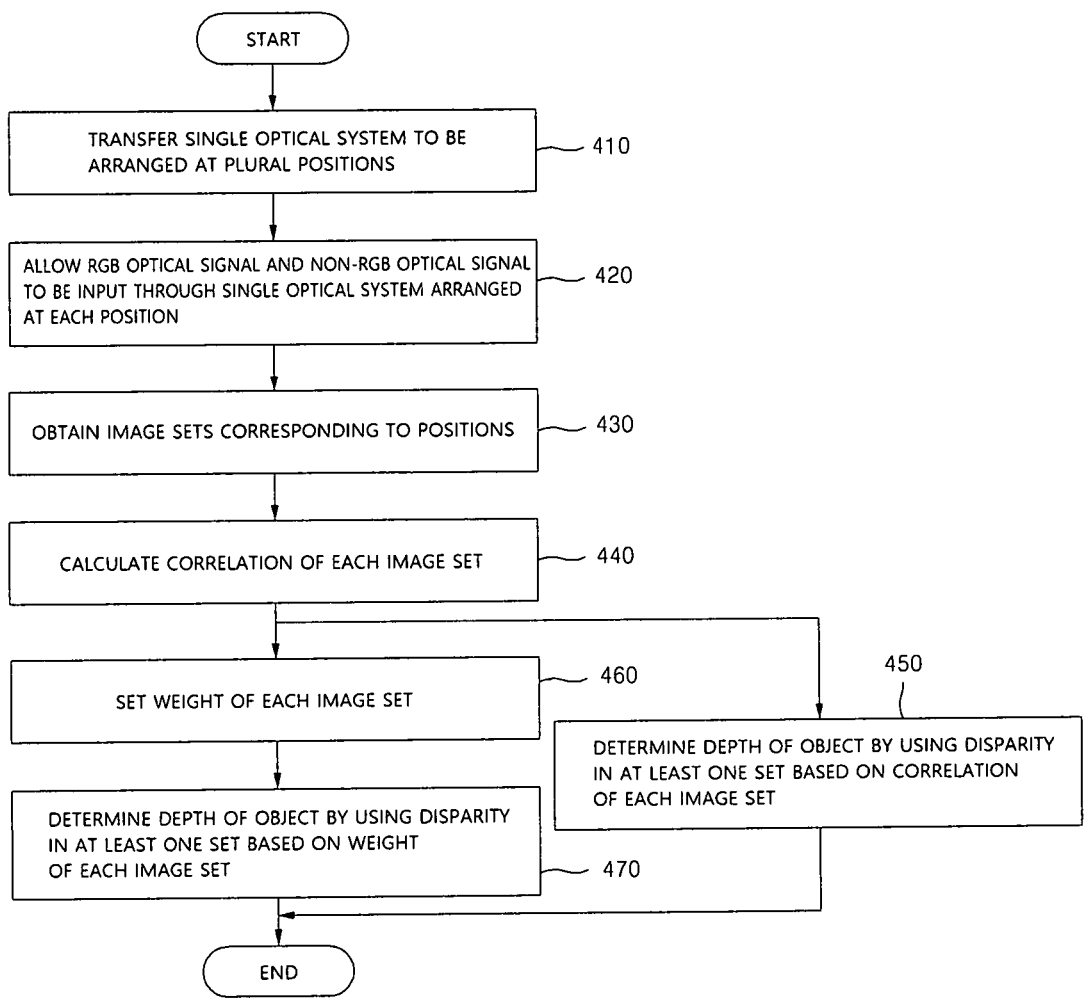
FIG. 4 is a flowchart illustrating a method of operating a multi-aperture camera system according to an embodiment of the inventive concept.

FIG. 4 is a flowchart illustrating a method of operating a multi-aperture camera system according to an embodiment of the inventive concept.

Referring to FIG. 4, in step 410, the multi-aperture camera system according to an embodiment of the inventive concept moves the optical system to allow the single optical system to be arranged at a plurality of positions, where the single optical system includes the first aperture through which the RGB optical signal is input and the second aperture through which the non-RGB optical signal is input. The moving of the signal optical system to arrange the optical system at the positions implies that the optical system moves relative to the image sensor such that the single optical system is arranged at the positions relative to the image sensor.

In this case, the first and second apertures may be formed on the single optical system such that the first and second apertures have mutually intersecting central positions. For example, the first and second apertures may be formed to have central positions such that the first and second apertures are offset in at least one of vertical, horizontal and oblique directions of the image sensor.

Then, in step 420, the multi-aperture camera system allows the RGB optical signal and the non-RGB optical signal to be input through the first and second aperture formed in the single optical system to be arranged at each position.

Then, in step 430, the multi-aperture camera system obtains the image sets corresponding to the positions as the signal optical system is arranged at each of the positions, where each of the image sets includes the RGB image obtained by processing the RGB optical signal and the non-RGB image obtained by processing the non-RGB optical signal.

Thereafter, the multi-aperture camera system determines the depth of the object by using the disparity in each image set. In this case, the disparity in each image set represents the disparity between the RGB image and the non-RGB image included in each image set.

In this case, the multi-aperture camera system may calculate the depth from the object to the signal optical system based on the disparity in each image set, the distance between the central positions of the first and second apertures, the depth of the object focused on the image sensor at each position, and the focal length at each position.

In detail, the multi-aperture camera system may calculate correlation of each image set in step 440 such that the depth of the object is determined by using the disparity in at least one of the image sets based on the correlation of each image set in step 450.

For example, after selecting the image set having the highest correlation from the image sets based on the correlations of the image sets, the multi-aperture camera system may determine the depth of the object by using the disparity in the selected image set.

In step 460, the multi-aperture camera system may set the weights to the image sets based on the correlations of the image sets, respectively and in step 470, may determine the depth of the object using the disparity of at least one image set based on the weights of the image sets.

For example, the multi-aperture camera system may set the weights to the image sets based on the correlations of the image sets, respectively and after extracting the depths of the object by using the disparities in the image sets, may determine the depth of the object according to the average value of the depths to which the weights are applied.

In more detail, the multi-aperture camera system may select some of the image sets based on the weights of the image sets and after extracting depths of the object by using the disparities in the selected image sets, may determine the depth of the object according to the average value of the depths to which the weights are applied.

Figure 5:
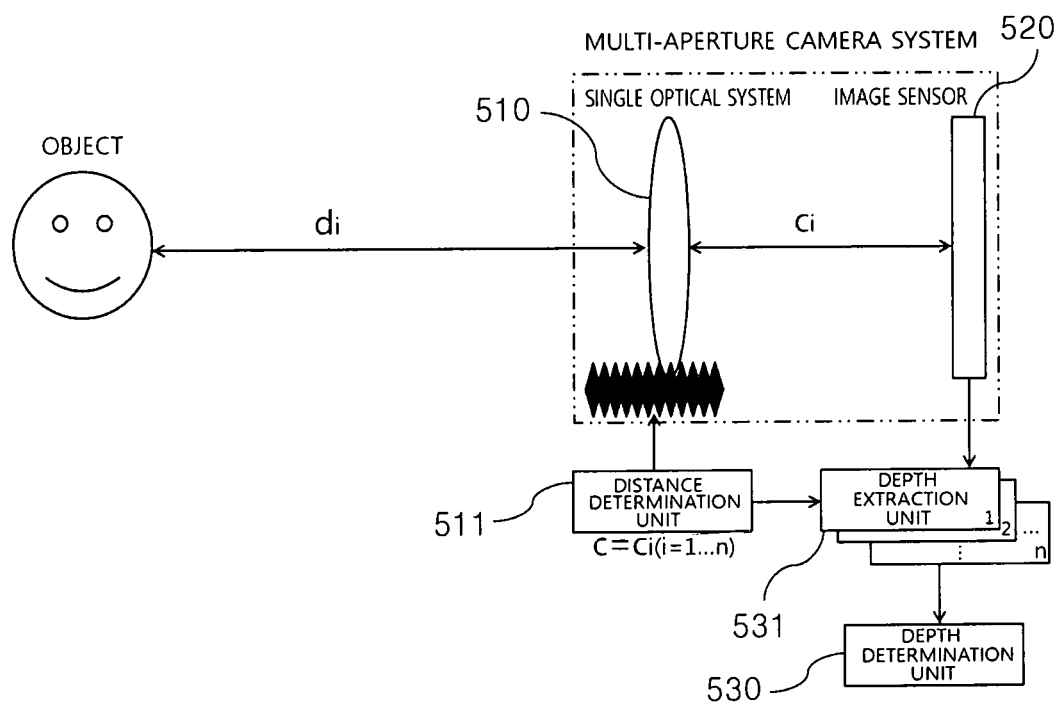
FIG. 5 is a block diagram illustrating a multi-aperture camera system according to an embodiment of the inventive concept.

FIG. 5 is a block diagram illustrating a multi-aperture camera system according to an embodiment of the inventive concept.

Referring to FIG. 5, a multi-aperture camera system according to an embodiment of the inventive concept includes a single optical system 510, an image sensor 520, and a depth determination unit 530.

The single optical system 510 is formed with a first aperture through which the RGB optical signal is input and a second aperture through which the non-RGB optical signal is input, and moves to be arranged at a plurality of positions. The movement of the signal optical system to be arranged at the positions implies that the single optical system moves relative to the image sensor such that the single optical system is arranged at the positions relative to the image sensor.

In detail, the single optical system 510 may move to the positions based on the image sensor 520 under control of a distance determination unit 511, so that a plurality of distances are set between the image sensor 520 and the single optical system 510.

In this case, the first and second apertures may be formed on the single optical system such that the first and second apertures have mutually intersecting central positions. For example, the first and second apertures may be formed to have central positions such that the first and second apertures are offset in at least one of vertical, horizontal and oblique directions of the image sensor 520.

The image sensor 520 obtains the image sets corresponding to the positions as the signal optical system is arranged at each of the positions, where each of the image sets includes the RGB image obtained by processing the RGB optical signal and the non-RGB image obtained by processing the non-RGB optical signal.

The depth determination unit 530 calculates the disparity in each image set and determines the depth of the object by using the disparity in each image set. The disparity in each image set represents the disparity between the RGB image and the non-RGB image included in each image set.

In this case, the depth determination unit 530 may calculate the depth from the object to the single optical system 510 based on the disparity in each image set, the distance between the central positions of the first and second apertures, the depth of the object focused on the image sensor 520 at each position at which the signal optical system 510 is arranged, and the focal length at each position at which the signal optical system 510 is arranged.

In detail, the depth determination unit 530 may calculate correlation of each image set such that the depth of the object is determined by using the disparity in at least one of the image sets based on the correlation of each image set.

For example, after selecting the image set having the highest correlation from the image sets based on the correlations of the image sets, the depth determination unit 530 may determine the depth of the object by using the disparity in the selected image set.

As another example, the depth determination unit 530 may set the weights to the image sets based on the correlations of the image sets, respectively and after extracting the depths of the object by using the disparities in the image sets through a depth extraction unit 531, may determine the depth of the object according to the average value of the depths to which the weights are applied.

In more detail, the depth determination unit 530 may select some of the image sets based on the weights of the image sets and after extracting the depths of the object by using the disparities in the selected image sets through the depth extraction unit 531, may determine the depth of the object according to the average value of the depths to which the weights are applied.

Although it is depicted in FIG. 5 that the distance determination unit 511, the depth extraction unit 531, and the depth determination unit 530 are provided at an outside of the multi-aperture camera system, the embodiment is not limited thereto and they may be provided in the multi-aperture camera system. In addition, the distance determination unit 511 and the depth extraction unit 531 may be adaptively provided in the depth determination unit 530 or the image sensor 520.

Figure 6:
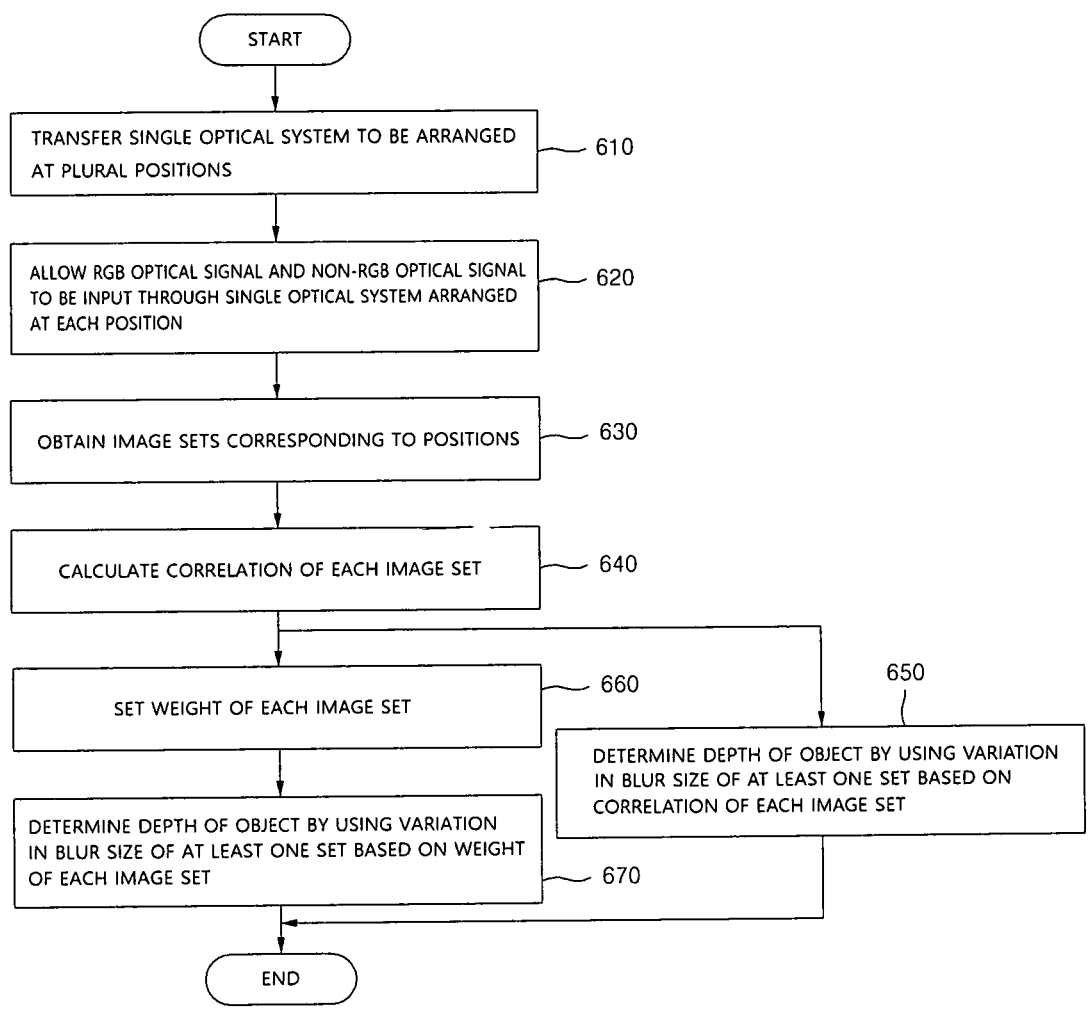
FIG. 6 is a flowchart illustrating a method of operating a multi-aperture camera system according to another embodiment of the inventive concept.

FIG. 6 is a flowchart illustrating a method of operating a multi-aperture camera system according to another embodiment of the inventive concept.

Referring to FIG. 6, in step 610, the multi-aperture camera system according to another embodiment of the inventive concept moves the optical system to allow the optical system to be arranged at the positions, where the optical system includes the first aperture through which the RGB optical signal is input and the second aperture through which the non-RGB optical signal is input. The moving of the optical system to arrange the optical system at the positions implies that the optical system moves relative to the image sensor such that the optical system is arranged at the positions relative to the image sensor.

In this case, the first and second apertures may be formed on one filter, but the embodiment is not limited thereto, and the first and second apertures may be formed on mutually different filters in one lens.

Then, in step 620, the multi-aperture camera system allows the RGB optical signal and the non-RGB optical signal to be input through the first and second aperture formed in the optical system to be arranged at each position.

Then, in step 630, the multi-aperture camera system obtains the image sets corresponding to the positions as the optical system is arranged at the positions, where the image set includes the RGB image obtained by processing the RGB optical signal and the non-RGB image obtained by processing the non-RGB optical signal.

Thereafter, the multi-aperture camera system determines the depth of the object by using the variation of the blur size in each image set.

In detail, in step 640, the multi-aperture camera system may calculate correlation of each image set such that the depth of the object is determined by using the variation of the blur size in at least one of the image sets based on the correlation of each image set in step 650.

For example, after selecting the image set having the highest correlation from the image sets based on the correlations of the image sets, the multi-aperture camera system may determine the depth of the object by using the variation of the blur size in the selected image set.

In step 660, the multi-aperture camera system may set the weights to the image sets based on the correlations of the image sets, respectively and in step 670, may determine the depth of the object using the variation of the blur size in at least one image set based on the weights of the image sets.

For example, the multi-aperture camera system may set the weights to the image sets based on the correlations of the image sets, respectively and after extracting the depths of the object by using the variation of the blur size in each image set, may determine the depth of the object according to the average value of the depths to which the weights are applied.

In more detail, the multi-aperture camera system may select some of the image sets based on the weights of the image sets and after extracting depths of the object by using the variation of the blur size in each of the selected image sets, may determine the depth of the object according to the average value of the depths to which the weights are applied.

Figure 7:
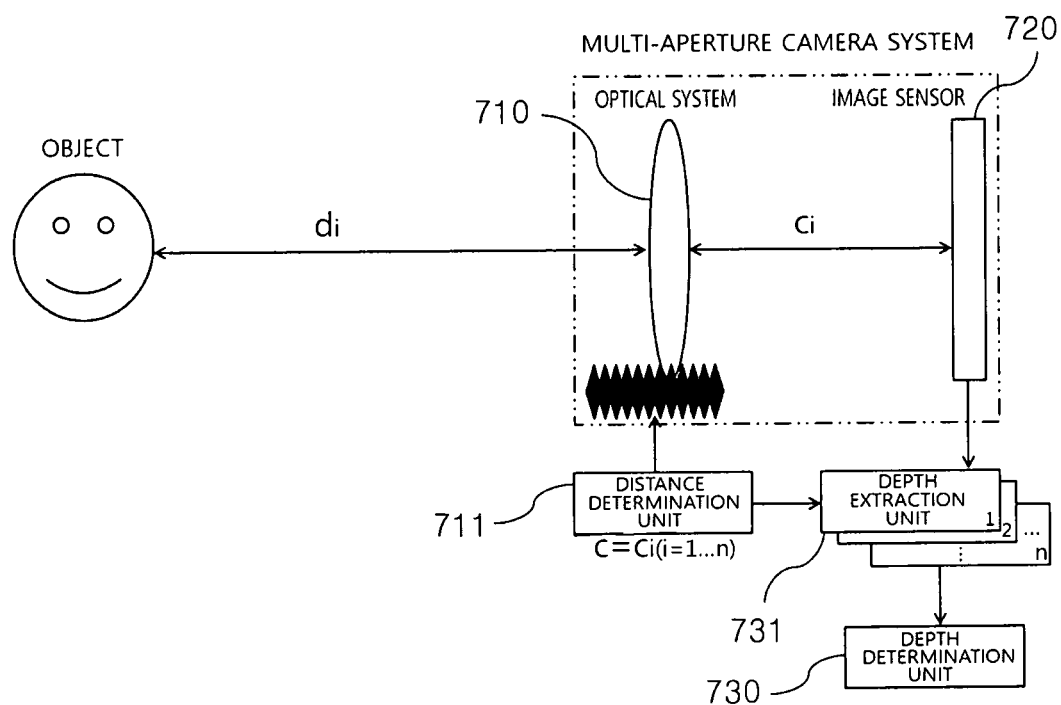
FIG. 7 is a block diagram illustrating a multi-aperture camera system according to another embodiment of the inventive concept.

FIG. 7 is a block diagram illustrating a multi-aperture camera system according to another embodiment of the inventive concept.

Referring to FIG. 7, a multi-aperture camera system according to an embodiment of the inventive concept includes an optical system 710, an image sensor 720, and a depth determination unit 730.

The optical system 710 is formed with a first aperture through which the RGB optical signal is input and a second aperture through which the non-RGB optical signal is input, and moves to be arranged at a plurality of positions. The movement of the optical system to be arranged at the positions implies that the optical system moves relative to the image sensor such that the optical system is arranged at the positions relative to the image sensor.

In detail, the optical system 710 may move to the positions based on the image sensor 720 under control of a distance determination unit 711, so that a plurality of distances is set between the image sensor 720 and the optical system 710.

In this case, the first and second apertures may be formed on one filter, but the embodiment is not limited thereto, and the first and second apertures may be formed on mutually different filters in one lens.

The image sensor 520 obtains the image sets corresponding to the positions as the optical system is arranged at the positions, where each of the image sets includes the RGB image obtained by processing the RGB optical signal and the non-RGB optical signal obtained by processing the non-RGB optical signal.

The depth determination unit 730 determines the depth of the object by using the variation of the blur size in each image set.

In detail, the depth determination unit 730 may calculate the correlation of each image set such that the depth of the object is determined by using the variation of the blur size in at least one of the image sets based on the correlation of each image set.

For example, after selecting the image set having the highest correlation from the image sets based on the correlations of the image sets, the depth determination unit 730 may determine the depth of the object by using the variation of the blur size in the selected image set.

As another example, the depth determination unit 730 may set the weights to the image sets based on the correlations of the image sets, respectively and after extracting the depths of the object by using the variations of the blur sizes in the image sets through a depth extraction unit 731, may determine the depth of the object according to the average value of the depths to which the weights are applied.

In more detail, the depth determination unit 730 may select some of the image sets based on the weights of the image sets and after extracting the depths of the object by using the variations of the blur sizes in the selected image sets through the depth extraction unit 731, may determine the depth of the object according to the average value of the depths to which the weights are applied.

Although it is depicted in FIG. 7 that the distance determination unit 711, the depth extraction unit 731, and the depth determination unit 730 are provided at an outside of the multi-aperture camera system, the embodiment is not limited thereto and they may be provided in the multi-aperture camera system. In addition, the distance determination unit 711 and the depth extraction unit 731 may be adaptively provided in the depth determination unit 730 or the image sensor 720.

Figure 8:
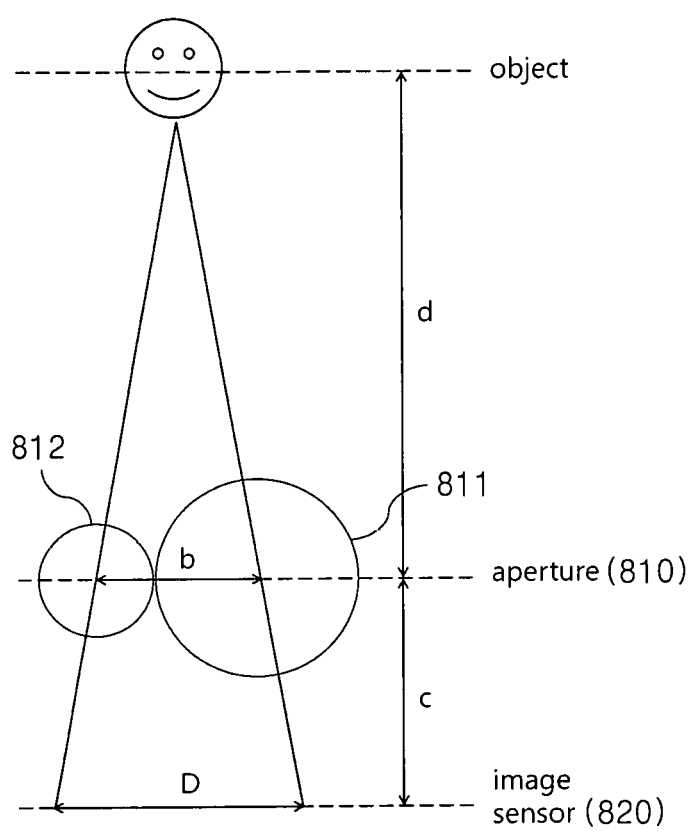
FIG. 8 is a view illustrating a principle of determining a depth by a multi-aperture camera system according to an embodiment of the inventive concept.

FIG. 8 is a view illustrating a principle of determining a depth by a multi-aperture camera system, which does not include any lenses, according to an embodiment of the inventive concept.

Referring to FIG. 8, a multi-aperture camera system according to an embodiment of the inventive concept includes a single optical system 810 in which first and second apertures 811 and 812 are formed and an image sensor 820. RGB and non-RGB optical signals are introduced through the first and second apertures 811 and 812 which may be formed to have mutually intersecting central positions.

In this case, a predetermined proportional relation may exist between distance b between the central positions of the first and second apertures 811 and 812, disparity D between the RGB and non-RGB images obtained through the first and second apertures 811 and 812, depth d between an object and the single optical system 810, and distance c between the single optical system 810 and the image sensor 820.

For example, as the distance b between the central positions of the first and second apertures 811 and 812 is increased, the disparity D between the RGB and non-RGB images is increased. According to a ratio between the distance b between the central positions of the first and second apertures 811 and 812 and the disparity D between the RGB and non-RGB images, the ratio between the depth d between the object and the single optical system 810 and the distance c between the single optical system 810 and the image sensor 820 may be determined.

Thus, as described above, the multi-aperture camera system according to an embodiment may determine the depth d between the object and the single optical system 810 by using the disparity D between the RGB and non-RGB images.

Although not shown, in common with the multi-aperture camera system including a lens, the predetermined proportional relation may exist between the distance b between the central positions of the first and second apertures, the disparity D between the RGB and non-RGB images obtained by the image sensor through the first and second apertures, the depth d between the object and the single optical system, and the distance c between the single optical system and the image sensor.

Figure 9:
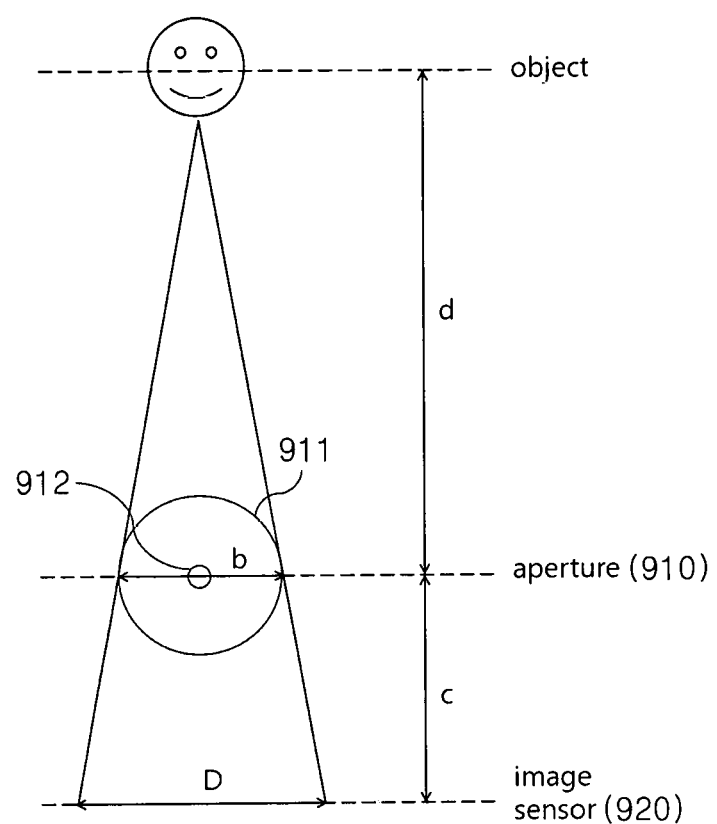
FIG. 9 is a view illustrating a principle of determining a depth by a multi-aperture camera system according to another embodiment of the inventive concept.

FIG. 9 is a view illustrating a principle of determining a depth by a multi-aperture camera system, which does not include any lenses, according to another embodiment of the inventive concept.

Referring to FIG. 9, a multi-aperture camera system according to another embodiment of the inventive concept includes an optical system 910 in which first and second apertures 911 and 912 are formed and an image sensor 920, where RGB and non-RGB optical signals are introduced through the first and second apertures 911 and 912.

In this case, a predetermined proportional relation may exist between diameter b of the first aperture 911, blur size D between the RGB and non-RGB images obtained by the image sensor 920 through the first and second apertures 911 and 912, depth d between an object and the optical system 910, and distance c between the optical system 910 and the image sensor 920.

For example, as the diameter b of the first aperture 911 is increased, the disparity D between the RGB and non-RGB images is increased. According to a ratio between the diameter b of the first aperture 911 and the blur size D between the RGB and non-RGB images, the ratio between the depth d between the object and the optical system 910 and the distance c between the optical system 910 and the image sensor 920 may be determined.

Thus, as described above, the multi-aperture camera system according to another embodiment may determine the depth d between the object and the single optical system 910 by using the blur size D between the RGB and non-RGB images.

Although not shown, in common with the multi-aperture camera system including a lens, the predetermined proportional relation may exist between the diameter b of the first aperture, the blur size D between the RGB and non-RGB images obtained by the image sensor through the first and second apertures, the depth d between the object and the optical system, and the distance c between the optical system and the image sensor.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this inventive concept provided they come within the scope of the appended claims and their equivalents.

What is claimed is:

1. A multi-aperture camera system for improving depth accuracy through a focusing distance scan, the multi-aperture camera system comprising:
   a single optical system comprising a first aperture through which a Red Green Blue (RGB) optical signal is input and a second aperture through which a non-RGB optical signal in a wavelength band different from a wavelength band of the RGB optical signal is input, the single optical system moving relative to an image sensor to be arranged at a plurality of positions;
   an image sensor configured to obtain a plurality of image sets corresponding to the positions as the single optical system moves relative to the image sensor to be arranged at the positions, wherein each of the image sets comprises an RGB image obtained by processing the RGB optical signal and a non-RGB image obtained by processing the non-RGB optical signal; and
   a depth determination unit comprising a computer processor configured to:
      calculate correlation of each of the image sets;
      set weights to the image sets based on the correlations of the image sets, respectively;
      extract a plurality of depths of an object by using disparities in the image sets; and
      determine a depth of the object based on an average value of the depths to which the weights are applied,
   wherein the first aperture and the second aperture are formed on the single optical system such that the first aperture and the second aperture have mutually intersecting central positions,
   whereas the central positions of the first and the second apertures are formed such that the first aperture and the second aperture are offset in oblique directions of the image sensor, and
   wherein the depth determination unit determines the depth of the object using a scan line processing scheme, the first and second apertures being formed to have central positions such that the first and second apertures are offset in a proceeding direction of the scan line processing scheme applied to the image sensor.

2. The multi-aperture camera system of claim 1, wherein the depth determination unit selects some of the image sets based on the weights of the image sets, extracts a plurality of depths of the object by using disparities in the selected image sets, and determines the depth of the object based on an average value of the depths to which the weights are applied.

3. The multi-aperture camera system of claim 1, wherein the depth determination unit 530 calculates the depth from the object to the single optical system, based on the disparity in each of the image sets, a distance between the central positions of the first and second apertures, the depth of the object focused on the image sensor at each of the positions, and a focal length at each of the positions at which the single optical system is arranged.

4. The multi-aperture camera system of claim 1, wherein the disparity in each of the image sets comprises a disparity between the RGB image and the non-RGB image included in each of the image sets.

5. A multi-aperture camera system for improving depth accuracy through a focusing distance scan, the multi-aperture camera system comprising:
   an optical system comprising a first aperture through which a Red Green Blue (RGB) optical signal is input and a second aperture through which a non-RGB optical signal in a wavelength band different from a wavelength band of the RGB optical signal is input, the optical system moving relative to an image sensor to be arranged at a plurality of positions;
   an image sensor configured to obtain a plurality of image sets corresponding to the positions as the optical system moves relative to the image sensor to be arranged at the positions, wherein each of the image sets comprises an RGB image obtained by processing the RGB optical signal and a non-RGB image obtained by processing the non-RGB optical signal; and
   a depth determination unit comprising a computer processor configured to:
      calculate correlation of each of the image sets;
      set weights to the image sets based on the correlations of the image sets, respectively;
      extract a plurality of depths of an object by using a variation of a blur size in each image set; and
      determine a depth of the object based on an average value of the depths to which the weights are applied,
   wherein the first and second apertures are formed to have central positions such that the first and second apertures are offset in oblique directions of the image sensor, and
   wherein the depth determination unit determines the depth of the object using a scan line processing scheme, the first and second apertures being formed to have central positions such that the first and second apertures are offset in a proceeding direction of the scan line processing scheme applied to the image sensor.

6. A method of operating a multi-aperture camera system for improving depth accuracy through a focusing distance scan, the method comprising:
   moving a single optical system relative to an image sensor such that the single optical system is arranged at a plurality of positions, wherein the single optical system comprises a first aperture through which a Red Green Blue (RGB) optical signal is input and a second aperture through which a non-RGB optical signal in a wavelength band different from a wavelength band of the RGB optical signal is input;
   allowing the RGB and non-RGB optical signals to be input through the first and second apertures, wherein the first and second apertures are formed in the single optical system which is arranged relative to the image sensor at each of the positions;
   obtaining a plurality of image sets corresponding to the positions as the single optical system is arranged at each of the positions, wherein each of the image sets comprises an RGB image obtained by processing the RGB optical signal and a non-RGB image obtained by processing the non-RGB optical signal;
   calculating correlation of each of the image sets;
   setting weights to the image sets based on the correlations of the image sets, respectively;
   extracting a plurality of depths of an object by using disparities in the image sets; and
   determining a depth of the object based on an average value of the depths to which the weights are applied,
   wherein the first and second apertures are formed on the single optical system such that the first and second apertures have mutually intersecting central positions,
   whereas the central positions of the first and the second apertures are formed such that the first and second apertures are offset in oblique directions of the image sensor, and
   wherein the depth determination unit determines the depth of the object using a scan line processing scheme, the first and second apertures being formed to have central positions such that the first and second apertures are offset in a proceeding direction of the scan line processing scheme applied to the image sensor.

* * * * *